United States Patent [19]

Lapetina

[11] 4,031,544
[45] June 21, 1977

[54] SONAR/TELEVISION SYSTEM FOR USE IN UNDERWATER EXPLORATION

[75] Inventor: Robert Anthony Lapetina, Salt Lake City, Utah

[73] Assignee: Edo Western Corporation, Salt Lake City, Utah

[22] Filed: Aug. 11, 1975

[21] Appl. No.: 603,696

[52] U.S. Cl. .................................. 358/99; 175/5; 166/.5

[51] Int. Cl.² ........................................ H04N 7/18

[58] Field of Search ............ 178/DIG. 1, 6.8, 7.83, 178/7.84; 175/5; 166/.5, .6; 358/99

[56] References Cited

UNITED STATES PATENTS

| 2,316,550 | 4/1943 | Bigalke | 178/7.84 |
|---|---|---|---|
| 2,843,844 | 7/1958 | Naidich | 178/7.84 |
| 2,849,530 | 8/1958 | Fleet | 178/DIG. 1 |
| 3,014,984 | 12/1961 | Jacobson | 178/DIG. 1 |
| 3,191,695 | 6/1965 | Bates | 175/5 |
| 3,199,613 | 8/1965 | Malott | 175/5 |
| 3,268,659 | 8/1966 | Gibson | 178/7.84 |
| 3,513,909 | 5/1970 | Peterman | 166/.5 |
| 3,744,561 | 7/1973 | Shatto | 166/.5 |
| 3,753,296 | 8/1973 | Van Steenwyk | 33/304 |
| 3,780,220 | 12/1973 | Fugitt | 178/DIG. 1 |

Primary Examiner—Robert L. Griffin
Assistant Examiner—Michael A. Masinick
Attorney, Agent, or Firm—Criddle, Thorpe & Western

[57] ABSTRACT

A sonar/television system and method is disclosed whereby an underwater drill pipe may be guided to a re-entry guide base or assembly positioned on a sea floor. The system includes a scanner assembly having first and second elongated housings whose exterior dimensions enable insertion of the housings into the bore of the drill pipe. The upper end of the first housing is rotatably mounted to the lower end of the second housing. A television camera is disposed within the first housing and fixed to the second housing so that the camera remains fixed when the first housing is rotated, and a sonar transducer is mounted in the first housing to rotate therewith. Scenes viewed by the camera are reproduced on a screen of a television display apparatus in such a manner that, when the re-entry guide base is within view, markings on the screen indicate both the lateral positioning of the drill pipe relative to the guide base and also the altitude of the drill pipe above the guide base.

14 Claims, 5 Drawing Figures

FIG. IA
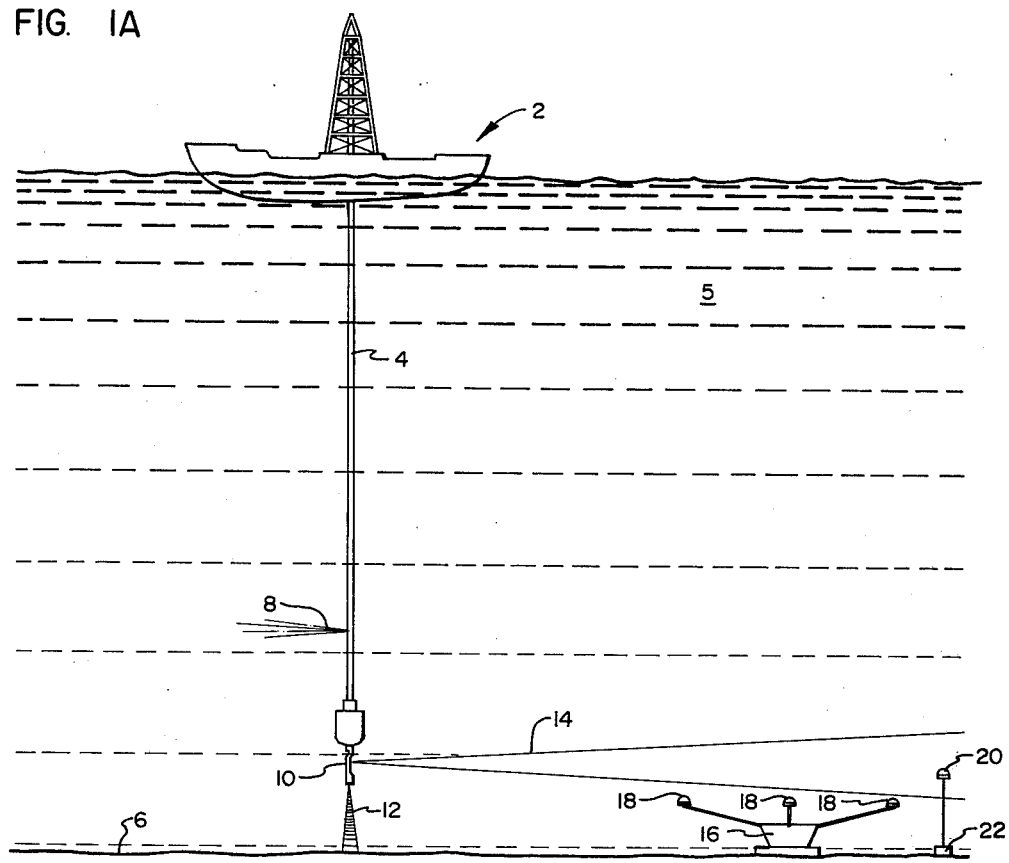
FIG. IB
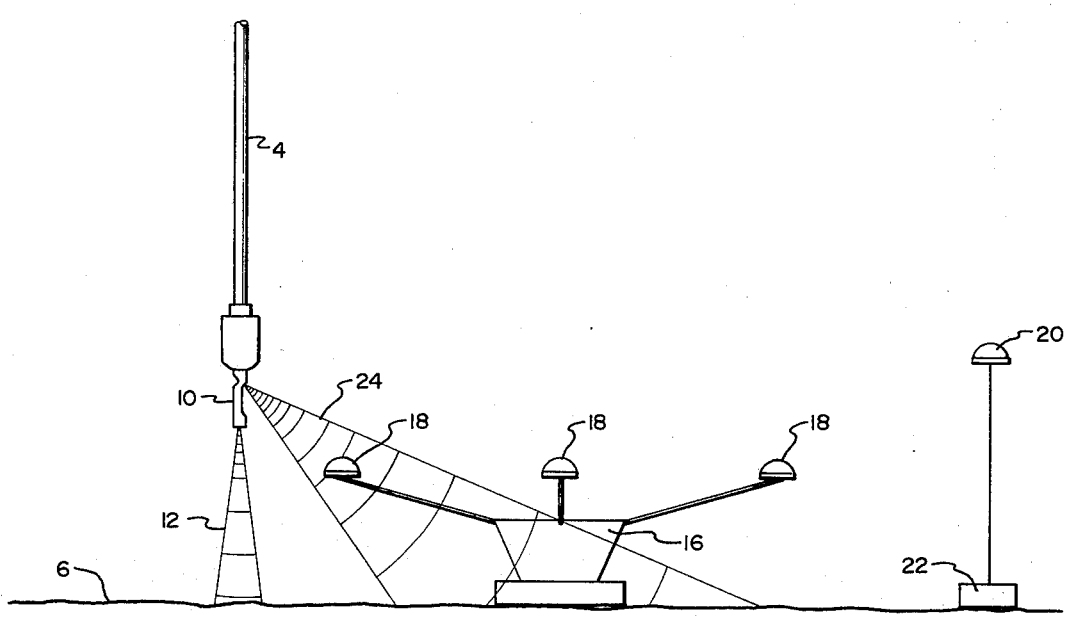

SONAR/TELEVISION SYSTEM FOR USE IN UNDERWATER EXPLORATION

BACKGROUND OF THE INVENTION

This invention relates to method and apparatus for guiding an underwater conductor such as drill pipe to a target on a sea floor.

Deep underwater drilling is carried out for a variety of purposes including drilling for oil and natural gas or simply to obtain floor samples from the ocean basin for research purposes. One of the primary problems in underwater drilling is the finding and re-entry of an established hole or ocean floor base to install therein various drilling equipment, to resume drilling following replacement of a worn drill bit, etc. For deep underwater drilling (several miles), this problem of re-entering an open hole or floor base has been likened to standing on a roof top and threading a needle on the ground by moving the upper end of a dangling thread. Because of the difficulty of re-entry, it has oftentimes been necessary simply to abandon a hole before completing the project.

One of the first methods adopted to facilitate hole re-entry involved the use of guide cables extending between the drilling vessel and a guide base positioned over the hole. The drill pipe would be attached to the guide cables and lowered to the hole. This method however is unsuitable for deep underwater drilling simply because of the excessive cost for long guide cables and because the guide cables and drill pipe tend to get tangled as a result of ocean currents and vessel drift.

Another method of underwater hole re-entry involves the use of underwater sonar apparatus to locate the hole and guide the end of the drill pipe to the hole. This method, developed by Edo Western Corp., provides for inserting a sonar transducer assembly inside the drill pipe until the assembly protrudes out the bottom of the pipe. A funnel having a plurality of sonar reflectors spaced about the funnel is positioned over the hole. When the transducer is activated to detect the sonar reflectors, a combination of vessel movement and drill pipe movement effected by a hydrojet at the end of the drill pipe are employed to guide the end of the drill pipe to a position over the funnel. The drill pipe can then be lowered into the funnel and thus into the hole. See *Ocean Industry*, August, 1970 and *Ocean Industry*, June, 1970. Although this method of hole re-entry is superior to the guide cable method, it is difficult with this method to re-enter any underwater holes except those equipped with a fairly large funnel since precise location of the drill pipe with respect to the hole cannot be determined.

Another arrangement suggested for underwater hole re-entry is disclosed in R. A. Malott et al., U.S. Pat. No. 3,199,613. With this arrangement, a television camera is lowered through the bore of a drill pipe to the lower end thereof to transmit to a television receiver on board a drilling vessel a view of the sea floor. The lower end of the drill pipe is moved until the hole comes into camera view and then the drill pipe is guided into registry with the hole. This arrangement facilitates precise location of the drill pipe with respect to the hole once the hole is within view of the television camera, but no provision is made for guiding the drill pipe to the vicinity of the hole. Rather, the drill pipe is simply moved in arcs in the general area of the hole until the hole comes into view.

Still another arrangement which seeks to combine the use of sonar and television for underwater hole re-entry is discussed in the publication *Off Shore*, November, 1970. This arrangement contemplates attaching to the end of a drill pipe a re-entry tool equipped with an underwater television camera and sonar. The sonar is used to guide the drill pipe to the vicinity of the hole and, when the drill pipe is within range for television monitoring, the television camera is activated to provide a view of the sea floor and hole to enable guiding the drill pipe to equipment placed over the hole. Although this arrangement combines the use of a sonar system and television camera, the re-entry package is very bulky and must be attached to the exterior of the drill pipe in which position it may interfere with the coupling of the drill pipe to guide base structure located over the hole. Also, because the television camera is attached to the outside of the drill pipe, it must be tilted at an angle to provide a view of the area directly under the drill pipe and this angular view makes it difficult to guide the drill pipe to the hole. Further, it appears from the aforecited article that the re-entry tool, together with sonar and television camera, remain attached to the drill pipe underwater while the drilling operation is carried out. This not only ties up the sonar and television camera but also subjects them to the debilitating effects of drilling vibration and of being underwater for long periods of time.

SUMMARY OF THE INVENTION

It is an object of the present invention to provide a compact sonar and television camera combination for use in underwater exploration and particularly in locating underwater drill holes.

It is also an object of the present invention to provide a sonar/television camera unit packaged to enable insertion thereof in underwater conductors such as drill pipes.

It is still another object of the present invention to provide a sonar/television system having sonar transducer apparatus capable of scanning substantially through a 360° angle.

It is a further object of the present invention, in accordance with one aspect thereof, to provide an underwater sonar/television system suitable for insertion thereof into the lower end of an underwater drill pipe and having sonar apparatus capable of determining the altitude of the apparatus above a sea floor and of scanning generally laterally and downwardly of the lower end of the drill pipe.

It is also an object of the present invention, in accordance with another aspect thereof, to provide an underwater hole re-entry sonar/television system having a television camera, and display apparatus which includes markings thereon to enable determining the lateral positioning of the television camera with respect to an underwater hole and to enable determining altitude of the camera above the hole.

The above and other objects of the invention are realized in an illustrative embodiment which includes a housing having exterior dimensions to allow fitting the housing inside the hollow of an underwater conductor such as a drill pipe. A television camera is fixed in the housing so that the camera is directed downwardly to record scenes appearing therebelow. Sonar transducer apparatus is carried by the housing and is adopted to transmit acoustical signals generally in a 360° angle outwardly of the housing and to receive reflected acoustical signals.

In accordance with one aspect of the invention, three sonar transducers are provided in the housing, one of which is disposed at the bottom of the housing to transmit acoustical signals downwardly, another of which is disposed at the side of the housing to transmit acoustical signals generally laterally of the housing, and a third of which is disposed at the side of the housing to transmit acoustical signals at an angle downwardly from the horizontal. In accordance with another aspect of the invention, display apparatus is coupled to the television camera to display scenes viewed by the camera. The display means includes markings on the face thereof which enable determination of the altitude of the camera above an underwater hole guide base when certain parts of the guide base displayed on the face coincide with certain ones of the markings.

DESCRIPTION OF THE DRAWINGS

The above and other objects, features and advantages of the invention will become apparent from a consideration of the following detailed description presented in connection with the accompanying drawings in which:

FIGS. 1A through 1C are side views of a sonar/television system made in accordance with the present invention, showing the system as it would be utilized to guide a drill pipe to an underwater hole.

DETAILED DESCRIPTION

Figure 1C:
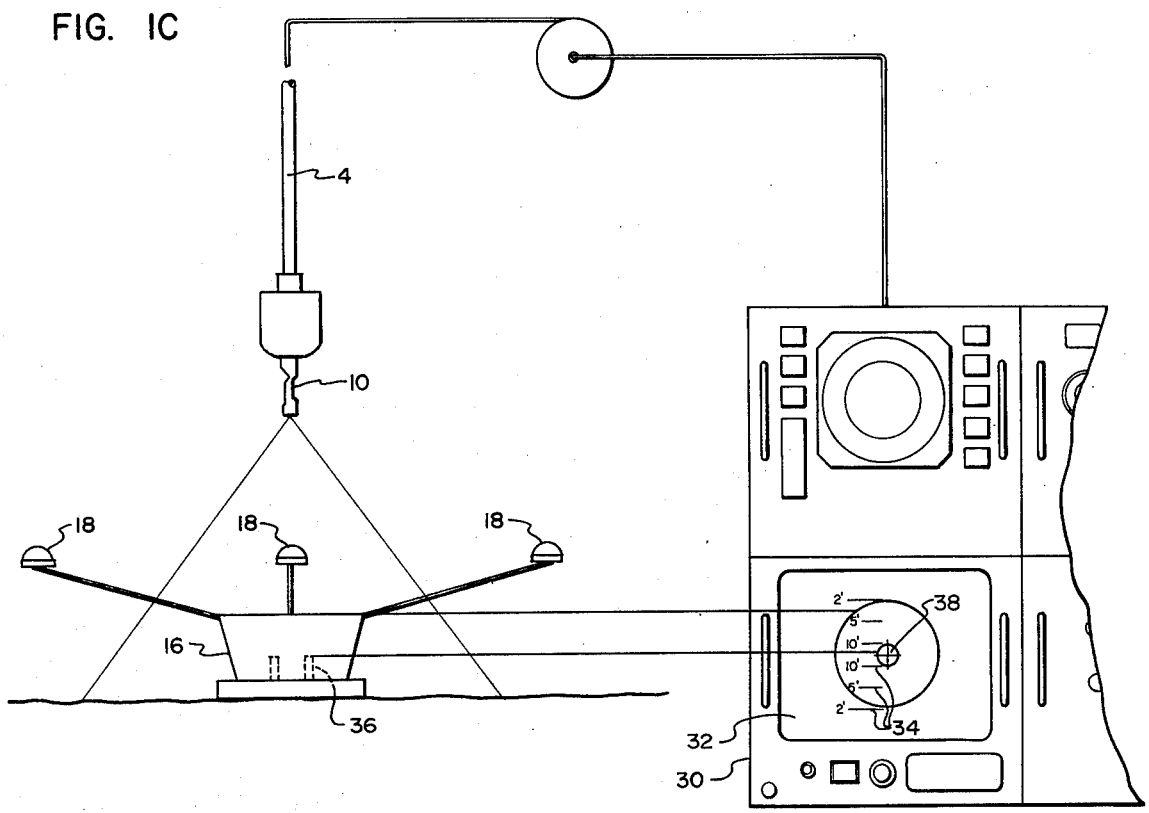

FIGS. 1A through 1C illustrate various stages of one process of re-entering an underwater drill hole using the sonar/television system of the present invention. It should be understood that although a particular method of hole re-entry is described, the sonar/television system to later be described can be used in a variety of situations requiring location of underwater objects. These situations might include simply finding a piece of equipment which has accidently dropped to the sea floor, as well as the location of an underwater well for either attachment or removal of drilling, pipeline, or well equipment.

Referring specifically to FIG. 1A, there is shown a drilling vessel 2 from which an underwater drilling and hole re-entry operation is controlled. A drill pipe 4 (sometimes referred to as a drill string) extends through an opening in the bottom of the vessel 2 downwardly into the water 5 toward the sea floor 6. The drill pipe 4, of course, may be raised or lowered from the vessel 2, using well known winch apparatus, and also rotated. The drill pipe 4 includes a small opening near the end thereof through which a stream of water 8 is forced to create a type of jet action to move the lower end of the drill pipe in any desired direction. That is, by proper rotation of the drill pipe 4 and generation of the water jet 8, the lower end of the drill pipe 4 can be moved as desired. Such control of a drill pipe is well known.

A scanner assembly 10 is inserted into the bore of the drill pipe 4 until a certain portion of the assembly protrudes out the lower end of the drill pipe as generally shown in FIG. 1A. As will later be described, the scanner assembly includes a plurality of sonar transducers for transmitting acoustical signals and receiving acoustical reflections as a result of such transmissions, and a television camera. One of such transducers (hereinafter referred to as the altitude transducer) is positioned to transmit an acoustical signal 12 downwardly toward the sea floor 6, and another of such transducers hereinafter referred to as the search transducer) is positioned to transmit an acoustical signal 14 laterally of the scanner assembly 10 as generally shown in FIG. 1A. A third sonar transducer (hereinafter referred to as the re-entry transducer) is positioned to transmit an acoustical signal 24 at an angle downwardly from the horizontal as shown in FIG. 1B.

Referring again to FIG. 1A, an underwater hold guide base structure in the form of a funnel 16 is positioned over the hole to be re-entered by the drill pipe 4. Spaced about and extending outwardly from the funnel 16 are three acoustical reflectors 18. A fourth acoustical reflector 20, anchored by a weight 22, is adapted to float at an elevation above the reflectors 18. Although a funnel-type configuration is shown for the underwater hole guide base, it should be understood that with the present invention a variety of different configurations could be used including much smaller guide base structures than heretofore employed.

With the sonar and television camera combination contained in a single tool insertable in the bore of a drill pipe, a rapid and less hazardous approach, mating and re-entry of an underwater hole may be effected. The initial search and approach to the hole is carried out using only the sonar while the final approach and mating employs both the sonar and the television. The re-entry operation begins by lowering the drill pipe 4 into the water until the end of the drill pipe is some predetermined distance from the sea floor. (The altitude of the end of the drill pipe 4 above the sea floor 6 can be approximated from depth information obtained from previous drilling in the underwater hole.) The scanner assembly 10 is then lowered into the bore of the drill pipe 4 until the end of the assembly protrudes out the bottom of the drill pipe. The altitude transducer is then activated to enable a determination of the distance of the scanner assembly 10 above the sea floor 6, and the drill pipe 4 and assembly 10 are then raised or lowered to a height above the sea floor approximately equal to the height of the reflector 20. (Use of soners generally to determine depths is well known and the sonar readings now being described would be presented on displays located on the vessel 2.) The search transducer is activated to transmit an acoustical signal 14 generally horizontally from the assembly 10, and the lower portion of the assembly containing the search transducer is caused to rotate so that the signal 14 sweeps through an angle of 360°. When the reflector 20 is detected using the search transducer, the vessel 2 is maneuvered to bring the bottom of the drill pipe 4 toward the guide base funnel 16.

While the vessel 2 is being maneuvered toward the funnel 16, the altitude transducer is maintained activated to provide a continuous reading of the altitude of the scanner assembly 10 above the sea floor 6.

As the vessel 2 is moved toward the funnel 16, the re-entry transducer is activated to transmit an acoustical signal 24 which also sweeps through 360° (see FIG. 1B). When the drill pipe 4 is moved close enough to the funnel 16, three blips, representing reflections from the three reflectors 18, will appear on the re-entry transducer display located on the ship. With these three blips, the lower end of the drill pipe 4 can be positioned at a location generally above and centered within the three reflectors 18 as shown in FIG. 1C.

After centering the drill pipe 4 using the re-entry sonar transducer, the television camera is activated and lights located in the bottom of the scanner assembly 10 are turned on to direct beams of light downwardly. The drill pipe 4 is then lowered and a view of the funnel 16 is transmitted by the television camera to a television display unit 30 located on the ship. With a view of the funnel 16 from the lower end of the drill pipe 4 being displayed, the final lowering and mating of the drill pipe 4 with the underwater hole can be carried out safely and rapidly.

The display unit 30 includes a face plate 32 having a plurality of markings 34 in the form of range bars. These bars are arranged in a generally parallel fashion and are spaced so that when certain portions of the guide base funnel 16 coincide with certain ones of the markings, the altitude of the assembly 10 above the funnel 16 is indicated. For example, one pair of spaced-apart bars bear the marking "10'", another pair bear the marking "5'", and still a third pair bear the marking "2'". These bars are spaced so that, for example, when a circular underwater hole collar 36 is displayed on the face plate 32 between the two "10'" markings, the assembly 10 will be 10 feet above the collar 36. As the assembly 10 is lowered further, the collar 36 will appear larger on the face plate 32 and ultimately reach a point where the perimeter of the collar 36 will coincide with the "5'" markings indicating that the assembly 10 is five feet above the collar, etc.

Also inscribed on the face plate 32 is a set of centering cross bars 38 for use in aligning and centering the scanner assembly 10 over the guide base funnel 16. In particular, the drill pipe 4 is moved until the centering cross bars 38 appear inside the perimeter of the collar 36 displayed on the screen, much like sighting through a rifle telescope. The markings 34 and 38 on the face plate 32 thus provide for both centering the drill pipe 4 for final mating and re-entry and for indicating the altitude of the drill pipe above the guide base funnel 16.

Figure 2A:
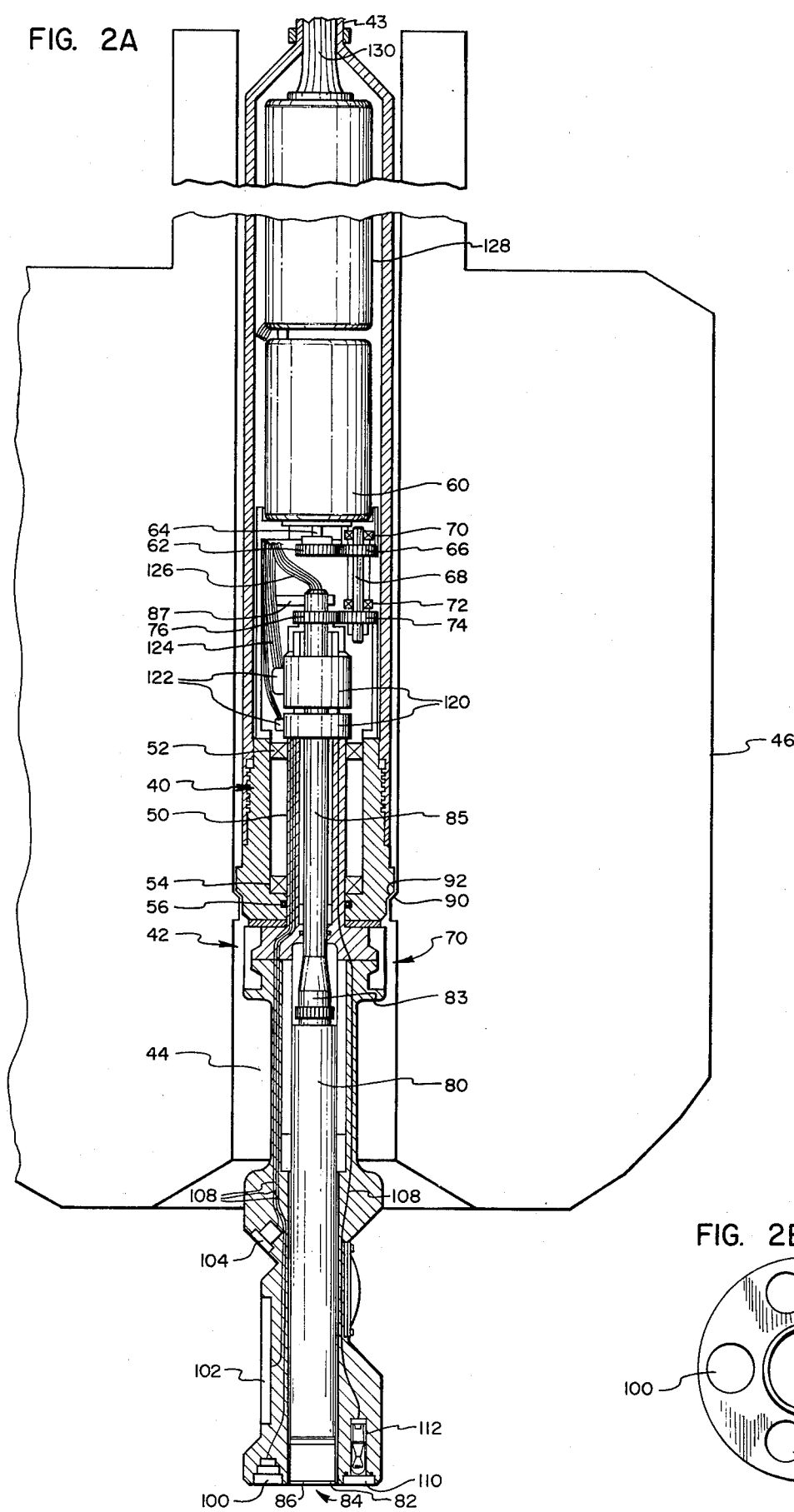
FIGS. 2A and 2B show a side cross-sectional view and a bottom view respectively of the scanner assembly of the system of FIGS. 1A through 1C.
Figure 2B:
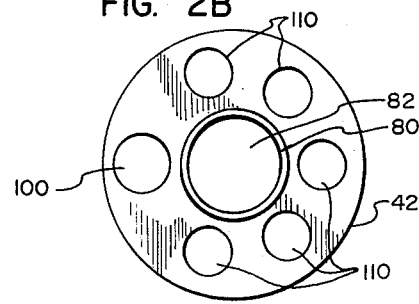

FIG. 2A shows a side cross-sectional view of the lower end of the scanner assembly of the present invention as it would be positioned in the bore of a drill pipe. FIG. 2B shows a bottom view of the assembly of FIG. 2A. Referring now to FIG. 2A, there is shown a scanner assembly 10 which includes a first elongated, generally cylindrical housing 40 and a second elongated generally cylindrical housing 42, both disposed in the bore 44 of a latch bumper head 46 of a drill pipe. The upper end of the housing 40 is coupled to a cable 43 which extends upwardly through the drill pipe to winch apparatus on the ship. The outer dimensions of the housings 40 and 42, of course, are such that the housings can be readily inserted into the bore of a drill pipe. A typical exterior diameter for the housings 40 and 42 would be three inches.

A sloping shoulder 90 is provided on the exterior surface of the housing 40 to limit the downward travel of the housings 40 and 42 by contacting and resting upon a corresponding shoulder 92 located in the bore of the bumper head 46. The shoulders 90 and 92 are located so that when the shoulder 90 is resting upon the shoulder 92, the lower end of the housing 42 protrudes from the bottom of the bumper head 46 just enough to expose the sonar transducers as will hereinafter be described.

The upper portion of the housing 42 is rotatably mounted to the lower end of the housing 40, and includes a portion 50 which extends upwardly within the housing 40. The portion 50 of the housing 42 is held by a pair of bearings 52 and 54 so that the portion 50 may be rotated within the housing 40. Standard O-ring seals 56 seal the interior of the housing 40 from the bore 44.

The lower housing 42 is caused to rotate by an electric motor 60 located within the upper housing 40 just above the portion 50 of the lower housing 42. A driving gear 62 is mounted on the drive shaft 64 of the motor and is positioned to mesh with and engage an intermediate gear 66 mounted on one end of a shaft 68. The shaft 68 is rotatably held in place by bearings 70 and 72 and a second intermediate gear 74 is mounted on the other end of the shaft. The gear 74 meshes with and engages an annular driven gear 76 mounted at the top end of the portion 50 of the housing 42. Thus, when the motor 60 causes the driving gear 62 to rotate, the intermediate gear 66 is caused to rotate and thereby rotate the shaft 68 and the other intermediate gear 74. The intermediate gear 74, in turn, causes the driven gear 76 to rotate and thereby cause the housing 42 to rotate.

A television camera 80 is disposed within the housing 42 so that the camera lens 82 are exposed through an opening 84 in the bottom of the housing 42. Some type of transparent material 86, such as glass, is positioned over the opening 84 to isolate the camera 80 from the sea water. The camera 80 is positioned in the housing 2 so that the lens 82 is directed downwardly for viewing the sea floor when the housing 42 is disposed in the end of a drill pipe.

The television camera 80 is coupled by way of a connector 83 to a hollow shaft 85 which contains the signal carrying cable connected to the camera 80. The shaft 85 extends within the housing 42 and through the driven gear 76 to a clamp 87 which holds the shaft in a fixed relation to the housing 42. Thus, the shaft 85 and camera 80 are fixed in a stationary position relative to the housing 40.

Mounted in the housing 42 are an altitude transducer 100, a search transducer 102, and a re-entry transducer 104 as previously mentioned. The altitude transducer 100 is fixed in the bottom of the housing 42 adjacent the opening 84 and is positioned to transmit an acoustical signal downwardly of the housing 42 and to receive acoustical signals traveling upwardly toward the housing. The search transducer 102 is positioned in the side of the housing 42 to transmit an acoustical signal laterally of the housing and to receive acoustical signals traveling laterally toward the housing. Finally, the re-entry transducer 104 is positioned in the side of the housing 42 so as to transmit an acoustical signal at a 35° angle downwardly from the horizontal and to receive acoustical signals traveling at substantially the same angle upwardly toward the housing. Transducers such as transducers 100, 102 and 104 for transmitting and receiving acoustical signals are simply well known ultrasonic transducers. See, for example, "Underwater Acoustics," edited by R. W. B. Stephens, Wiley - Interscience, 1970.

Also disposed at the bottom of the housing 42 above openings covered by transparent material 110 are a plurality of lamps 112 spaced about the camera 80 (see FIG. 2B). The lamps are provided to illuminate the sea floor and in particular the scene being viewed by the camera 80. The lamps 112 are simply fixed in the wall of the housing 42 as shown in FIG. 2A and are directed downwardly as also shown.

The transducers 100, 102 and 104 and the lamps 112 are coupled by way of electrical conductors 108 to slip rings 120 mounted about the upper portion 50 of the housing 42. Contact brushes 122, mounted on the interior wall of the housing 40 are positioned to contact the slip rings 120 as the rings are rotated with the rotation of the housing 42. Electrical conductors 124 are coupled to the brushes 122 and conductors 126 are coupled to the television camera 80, and both extend upwardly within the housing 40 for connecting to sonar and television circuitry contained in the housing 128. This circuitry is then coupled by way of electrical cables 130 to on-vessel power and display equipment.

In the manner described, a compact, easy to use sonar/television system is provided for use with an underwater conductor for locating underwater objects or well holes. The system is especially adapted for facilitating a rapid and safe mating of a drill pipe with an underwater hole guide base and a re-entry of the drill pipe in the hole. The television camera is positioned to provide a field of view directly downwardly from the end of the drill pipe to enable more accurate centering of the drill pipe with respect to the underwater hole. The television camera is maintained stationary in the housing 42 while the housing 42 is rotated to carry the various sonar transducers and provide the desired sonar scanning operation.

Although sonar scanning by rotation of one housing with respect to another has been described, it is apparent that full-circle scanning could be accomplished electronically by positioning a series of sonar transducers around the housing 42, and then sequentially activating the transducers to transmit acoustical signals. In this manner, acoustical signals may be transmitted throughout a 360° angle as desired.

It is to be understood that the above-described arrangement is only illustrative of the application of the principles of the present invention. Numerous other modifications and alternative arrangements may be devised by those skilled in the art without departing from the spirit and scope of the present invention and the appended claims are intended to cover such modifications and arrangements.

What is claimed is:

1. A sonar/television system for use with a hollow underwater conductor in locating underwater objects comprising
a first housing having exterior dimensions which enable insertion thereof into the hollow of the underwater conductor,
a television camera disposed within said housing so that the camera is directed downwardly of the housing to record scenes appearing therebelow, and
transducer means carried by said housing for transmitting acoustical signals downwardly of the housing and also generally laterally of the housing through an angle of substantially 360° about the housing and for receiving reflected acoustical signals.

2. A sonar/television system as in claim 1 wherein said transducer means includes
a first sonar transducer carried by said housing to transmit acoustical signals downwardly of the housing and to receive acoustical signals traveling upwardly to the housing,
a second sonar transducer carried by said housing to transmit acoustical signals generally horizontally of said housing substantially through an angle of 360° about the housing and to receive acoustical signals traveling generally horizontally to the housing, and
a third sonar transducer carried by said housing to transmit acoustical signals from the housing at an angle downwardly from the horizontal and substantially through an angle of 360° about the housing and to receive acoustical signals traveling to the housing at substantially the same angle.

3. A sonar/television system as in claim 1 further comprising means carried by said housing for transmitting light downwardly of said housing.

4. A sonar/television system as in claim 1 further comprising a second elongated, general cylindrical housing having exterior dimensions which enable insertion thereof into the hollow of the underwater conductor, wherein said first housing is elongated and generally cylindrical in shape, the upper end of which is rotatably mounted to the lower end of the second housing, and wherein said television camera is carried by said second housing to remain fixed when said first housing is rotated.

5. A sonar/television system as in claim 4 wherein said first housing has an opening in the bottom thereof, wherein said television camera is disposed within said first housing so that the camera lens is exposed through the opening, and wherein said sonar transducer means includes
a first sonar transducer disposed at the bottom of said first housing adjacent said opening to transmit acoustical signals downwardly of the housing and receive acoustical signals traveling upwardly to the first housing,
a second sonar transducer disposed in the side of said first housing to transmit acoustical signals laterally outwardly of the first housing and receive acoustical signals traveling laterally to the first housing, and
a third sonar transducer disposed in the first housing to transmit acoustical signals from the first housing at an angle downwardly from the horizontal and to receive acoustical signals traveling to the first housing at the same angle.

6. A system as in claim 5 wherein said first housing has an additional opening in the bottom thereof adjacent the first-mentioned opening, said system further comprising a lamp disposed in the second housing above said additional opening to transmit light through the opening downwardly of the second housing.

7. A system as in claim 5 wherein said first housing has a plurality of additional openings in the bottom thereof located about the first-mentioned opening, said system further comprising a plurality of lamps, each disposed above a different one of said additional openings to transmit light through the openings downwardly of the first housing.

8. A system as in claim 4 wherein said second housing includes an opening in the bottom thereof, and wherein a portion of said first housing extends through such opening into said second housing and is rotatably mounted therein, said system further comprising means disposed in the second housing and coupled to said portion of the first housing for causing said first housing to rotate.

9. A system as in claim 8 further comprising a slip ring means mounted about said portion of said first housing to rotate therewith, means electrically coupling the sonar transducer means to said slip ring, and means maintained in sliding contact with said slip ring to conduct electrical signals from and apply electrical signals to the slip ring while the slip ring is either rotated or maintained stationary.

10. A sonar/television system for use in guiding an underwater pipe to a guide base positioned on a sea floor comprising
   a housing having exterior dimensions which enable insertion thereof into the bore of said pipe,
   a television camera disposed within said housing so that the camera is directed downwardly of the housing to record scenes appearing therebelow,
   sonar transducer means carried by said housing for transmitting acoustical signals outwardly of the housing and for receiving reflected acoustical signals, and
   television display means coupled to said television camera for displaying scenes viewed by the camera, said display means including a face plate having a plurality of markings thereon positioned and spaced to indicate the lateral positioning of the underwater pipe relative to the guide base and, when certain of the markings are aligned with certain portions of the guide base displayed on the display means, to indicate the altitude of the drill pipe above the guide base.

11. A system as in claim 10 wherein the faceplate markings comprise spaced apart, generally parallel bars, and indicia associated with the bars to indicate the altitude of the drill pipe above the re-entry guide base when certain portions of the re-entry guide base are displayed on the display means between a selected pair of said bars.

12. A system as in claim 11 wherein the faceplate markings further comprise a set of cross bars positioned substantially at the center of the faceplate to indicate the center of the field of view of the television camera.

13. A method of guiding an underwater pipe suspended from a vessel on the surface of a body of water to an underwater well in which at least one acoustical reflector is positioned near the well, said method comprising
   a. lowering a sonar/television system within the bore of said pipe to a position in which the system partially protrudes out the lower end of the pipe so that a television camera of the system may record scenes appearing below the lower end of the pipe and so that a sonar transducer means of the system may transmit acoustical signals outwardly from the lower end of the pipe and receive reflected acoustical signals,
   b. activating the sonar transducer means to scan generally downwardly and laterally of the lower end of the pipe through an angle of 360° to detect the location of the acoustical reflector,
   c. moving the lower end of the pipe toward the acoustical reflector,
   d. activating the television camera to transmit the scenes viewed thereby to a television receiver located on the vessel, and
   e. moving the lower end of the pipe into a position wherein the well is within view of the television camera below the pipe, 14. The method of claim 13 of guiding an underwater pipe to an underwater well in which a plurality of acoustical reflectors are positioned about the well, wherein steps (b) and (c) comprise
   f. activating a first sonar transducer of the system to determine the altitude of the end of the pipe above the sea floor,
   g. moving the lower end of the pipe to a predetermined altitude above the sea floor,
   h. activating a second sonar transducer of the system to scan generally laterally of the lower end of the pipe to detect the location of the acoustical reflectors,
   i. moving the lower end of the pipe generally to within a certain distance of the acoustical reflectors,
   j. activating a third sonar transducer of the system to scan generally downwardly from the horizontal to locate the acoustical reflectors, and
   k. moving the lower end of the pipe to a position above and generally centered within the acoustical reflectors above the underwater well.

* * * * *